United States Patent
Zein et al.

(10) Patent No.: US 11,743,727 B2
(45) Date of Patent: Aug. 29, 2023

(54) WIRELESS COMMUNICATION TAG

(71) Applicant: Universal Toll Tag, Inc, Houston, TX (US)

(72) Inventors: Fareed Zein, Houston, TX (US); Abdelrahman Hamid, Torrance, CA (US)

(73) Assignee: Universal Toll Tag, Inc., Houston, TX (US)

(*) Notice: Subject to any disclaimer, the term of this patent is extended or adjusted under 35 U.S.C. 154(b) by 40 days.

(21) Appl. No.: 17/332,801

(22) Filed: May 27, 2021

(65) Prior Publication Data

US 2021/0377739 A1  Dec. 2, 2021

Related U.S. Application Data (60) Provisional application No. 63/030,564, filed on May 27, 2020.

(51) Int. Cl.
*H04W 12/08* (2021.01)
*H04W 4/80* (2018.01)
(Continued)

(52) U.S. Cl.
CPC ........... *H04W 12/08* (2013.01); *H04W 4/24* (2013.01); *H04W 4/80* (2018.02); *H04W 12/64* (2021.01)

(58) Field of Classification Search
CPC ......... H04W 4/80; H04W 4/02; H04W 4/023; H04W 4/029; H04W 64/00; H04W 4/44; H04W 12/06; H04W 12/02; H04W 40/20; H04W 8/26; H04W 4/025; H04W 64/003; H04W 8/005; H04W 4/24; H04W 88/02; H04W 12/08; H04W 92/18; H04W 12/108; H04W 48/04; H04W 4/024; H04W 12/47;
(Continued)

(56) References Cited

U.S. PATENT DOCUMENTS

2014/0025444 A1* 1/2014 Willis ............... G06Q 20/3272
705/13
2017/0364719 A1   12/2017 Boehm et al.
(Continued)

OTHER PUBLICATIONS

International Search Report and Written Opinion for International application No. PCT/US2021/034644, dated Sep. 8, 2021, 20 pages.

*Primary Examiner* — Kwasi Karikari
(74) *Attorney, Agent, or Firm* — Polsinelli PC (57) ABSTRACT

Aspects of the present disclosure relate to systems and methods for a wireless communication tag. The tag is configured to uniquely identify an account associated with the user for granting the user access to a first access-controlled service controlled by a first authority and a second access-controlled service controlled by a second authority. The tag is implemented through an omnidirectional antenna removably coupled to a mobile device associated with the user. An amount of payment owed by the user in accessing the first access-controlled service from a plurality of access-controlled services including the first access-controlled service and the second access-controlled service across a plurality of authorities is determined and transfer of the amount of payment to the first authority selected from the plurality of authorities in response to the user accessing the first access-controlled service is facilitated.

21 Claims, 6 Drawing Sheets

(51) Int. Cl.
*H04W 4/24* (2018.01)
*H04W 12/64* (2021.01)

(58) Field of Classification Search
CPC ..... H04W 12/50; H04W 4/027; H04W 12/64; H04W 48/10; H04W 76/10; H04W 12/10; H04W 8/205; H04W 74/06; H04W 4/48
See application file for complete search history.

(56) References Cited

U.S. PATENT DOCUMENTS

2019/0019362 A1* 1/2019 Gravelle ................. H04W 4/80
2020/0359175 A1* 11/2020 Schobel ............. G08B 21/0277

* cited by examiner

310 — Associating a user with a wireless communication tag configured to uniquely identify an account associated with the user for granting the user access to a first access-controlled service controlled by a first authority and a second access-controlled service controlled by a second authority 320 — Identifying that the wireless communication tag is within a geofence respective to a wireless reader associated with provisioning the first access-controlled service based on a signal sent from the wireless communication tag to the wireless reader 330 — Determining, based at least in part on an occurrence of the wireless communication tag being within the geofence respective to the wireless reader, an amount of payment owed by the user in accessing the first access-controlled service from a plurality of access-controlled services 340 — Facilitating transfer of the amount of payment to the first authority selected from the plurality of authorities in response to the user accessing the first access-controlled service

WIRELESS COMMUNICATION TAG

CROSS REFERENCE TO RELATED APPLICATIONS

This application claims benefit to U.S. Application No. 63/030,564, Filed May 27, 2020, which is incorporated by reference in its entirety.

FIELD OF THE INVENTION

The present disclosure pertains to a wireless communication tag, more specifically, to a wireless communication tag that facilitates payment of a transaction.

BACKGROUND

A typical toll system electronically charges users a tolling fee for using certain roads, without the users physically stopping at a tollbooth to pay. The users generally open a pre-funded account to serve as a source of funds to pay for charges made with some type of an electronic tag associated with the pre-funded account. These pre-funded accounts are typically maintained by the system operator. These systems typically detect some tag identification associated with the tag using some type of sensor as the user passes through a toll gantry. Tag identification information may be contained for example in bar code labels, which are placed on the vehicle and detected by sensors at the toll gantry. Such tags typically take the form of a transponder that is attached to the inside of the windshield of a vehicle. The transponder stores a number identifying a user's account. The transponder is read to determine the account number, and the user's account is debited by the amount due for the toll. The user must from time to time add money to the account. Mobile devices, such as smart phones, tablet devices, and others, may be used to automate a variety of tasks not traditionally associated with mobile devices. RFID tag devices may be used to store information, such as an identifier, that can be read at a distance by a reader.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof, which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Figure 1:
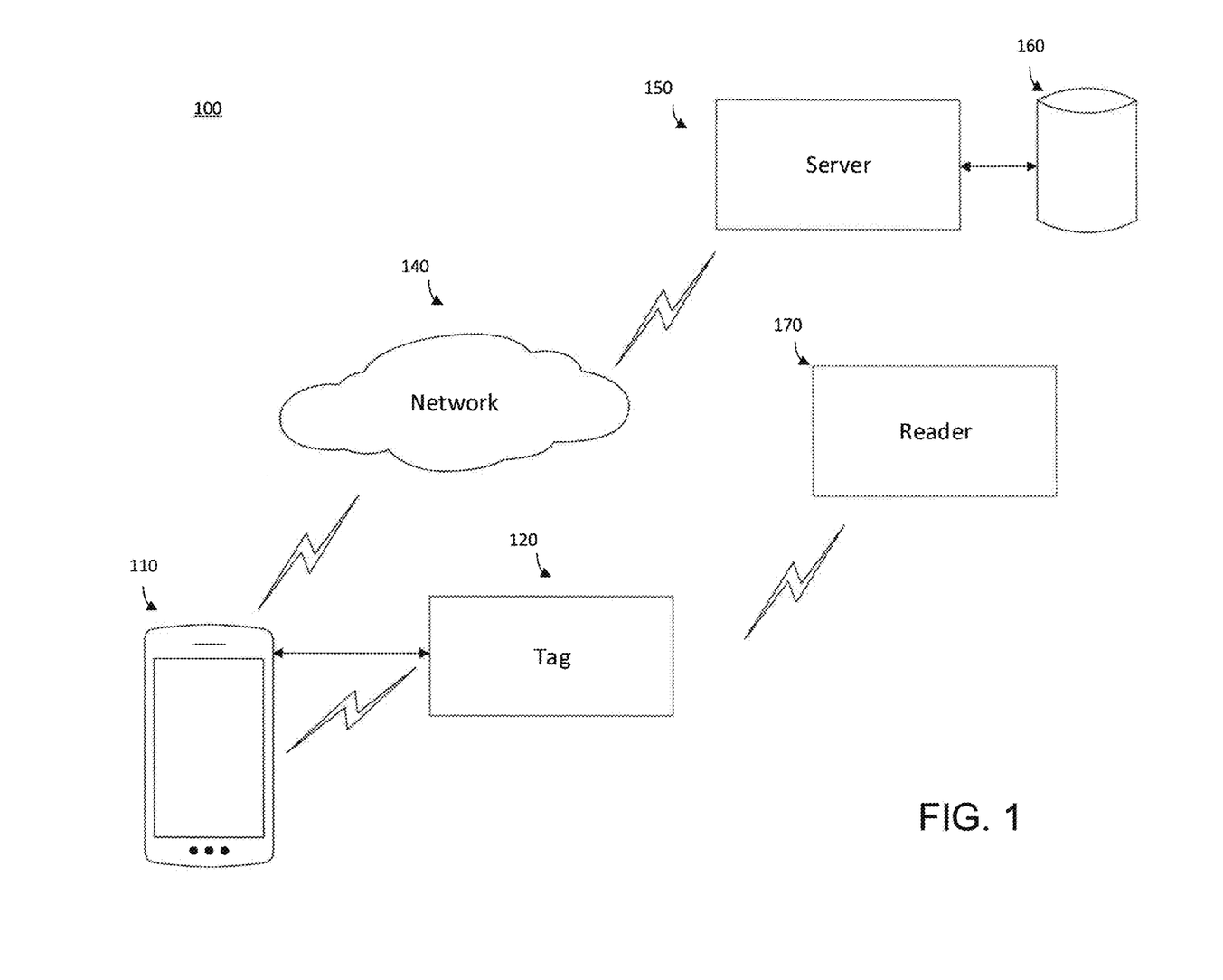
FIG. 1 is a schematic diagram of the exemplary system.

FIG. 1 is a schematic diagram of an example system for providing access to a plurality of access-controlled services. An access-controlled service, as used herein, can include an applicable service for which access to the service is controlled through one or more physical action points. For example, an access-controlled service can include a toll service or a parking service.

A system 100 for facilitating transactions via mobile devices is employed via a wireless communication tag 120 removably attached to the mobile device 110. A wireless communication tag 120 may include a transponder that transmits and receives radio signals. A wireless communication tag 120 may communicate with a wireless reader 170. A signal is transmitted by a reader 170 associated with an authority of an access-controlled service such as toll gantry, parking structure, university or work campus, etc. The wireless communication tag 120 responds to a signal by transmitting a tag ID that is associated with a user account and an agency ID associated with the authority. In the case where the reader 170 does not receive a response from the wireless communication tag 120, a picture may be taken of an identifier of the vehicle, e.g. a license plate number.

The wireless communication tag 120 contains identity information that can be used for conducting wireless transactions as well as radio communication means to communicate with the mobile device 110 and wireless reader 170. As the wireless communication tag 120 passes by the reader 170, a signal from the reader 170 causes the wireless communication tag 120 to respond via a communication link with identification information to identify the wireless communication tag 120. The reader 170 may transmit transaction information to the wireless communication tag 120 via the communication link. The transaction information can include information such as an identification of the reader 170, location, a transaction amount, the time, etc. In some examples, the wireless communication tag 120 may indicate to the mobile device 110 that it has been read and that it has responded to the reader 170 signal. In some examples, the reader 170 may write information to the wireless communication tag 120.

The mobile device 110 may have an application installed on the mobile device 110 that allows the mobile device 110 to facilitate transactions, including processing transaction information received from the wireless communication tag 120 and forwarding the transaction information to a server 150. The application may allow the user to configure and edit a user account. One or more vehicle license tag numbers of vehicles operated by the user of the mobile device or owner of the account may be maintained. The application on the mobile device 110 may be used to determine a Global Positioning System (GPS) location of the mobile device 110. The application may facilitate communication between the mobile device 110 and server 150 and payment database 160 allowing the wireless communication tag 120 to be used to facilitate and process a payment transaction. A web-based application may also be implemented with the same features of the mobile application.

In an example, the reader 170 may include a radio device attached or installed on a toll gantry. The reader 170 may be positioned on, near or above every toll gantry. The wireless communication tag 120 transmits and receives RF signals to and from the reader based on a GPS location of the mobile device 110. The wireless communication tag 120 may broadcast a signal back to the reader 170 that includes an agency ID and a tag ID. The server 150 looks up the agency ID and tag ID and matches it to an account stored in database 160.

The server 150 performs functionalities related to facilitating access to access-controlled services across a plurality of different authorities through the wireless communication tag 120 coupled to the mobile device 110. The functionalities performed by the server 150 in facilitating access to access-controlled services can be performed by a third party entity that is separate from authorities who actually provision the access-controlled services. For example, the third party entity can be implemented separate from toll authorities in different regions. Further the third party entity can be implemented separate from one or more users attempting to gain access to the access-controlled services. Accordingly, the third party entity can serve as an intermediary between users attempting to gain access to access-controlled services and authorities who actually provision the access-controlled services.

In some examples, server 150 may determine a payment amount for a user accessing an access-controlled service. The server 150 can determine an amount of payment owed based on one or more signals that are sent through either the mobile device 110 or the tag 120. Specifically, the server can determine an amount of payment owed based on one or more signal sent by the tag 120 in response to one or more RF signals received at the tag 120, e.g. from the reader 170. For example, the server 150 can identify an amount of payment owed based on signals sent by the tag 120 to toll gantries 170 signifying a duration by which a vehicle accessed a toll-based service.

The server 150 can facilitate the transfer of the amount of payment to authorities for controlling access to access-controlled services. Specifically, different payment rates and schedules for different access-controlled services and/or different authorities can be stored in database 160. The amount of payment can be deducted from an account, e.g. a third party account, associated with the user after or concurrently with the transfer of the amount of payment from the third-party system to the authority associated with the access-controlled service.

The wireless communication tag 120 may communicate the determined amount to the mobile device 110. The mobile device 110 may communicate with server 150 for the purposes of processing the payment amount. The payment transaction may include electronically transferring money from an account stored in the database 160 on the server 150 to another account stored in the database 160 on the server 150. In an example, the vehicle license plate number may be used, if the wireless communication tag 120 fails to be verified by the reader 170 upon passing through of the vehicle.

In some examples, if the reader 170 receives overlapping signals from one or more wireless communication tags 120 from the same vehicle at the same time, the server 150 may prioritize one communication tag 120 over the other. A default tag may be set and stored in the database 160 associated with the server 150. When overlapping signals are received, the default tag is charged to over duplicating charges.

In some examples, the mobile device 110 may itself act as wireless communication tag 120 without the need for an external wireless communication tag 120 attached to the mobile device 110. The mobile device 110 may provide the functionality of the wireless communication tag 120 and include a wireless receiver that is configured to generate and process the RF signals to and from the reader 170.

The mobile device 110 and server 150 may be communicably coupled to one another via network 140. Network 140 may include a Local Area Network, a Wide Area Network, a cellular communications network, a Public Switched Telephone Network, and/or other network or combination of networks. The wireless communication tag 120 and mobile device 110 may be communicably coupled to reader 170 via a communication link.

According to various implementations of the invention, mobile device 110 may include a mobile computing/processing device such as a wireless phone, a personal digital assistant, a smart phone, a tablet computing device, and/or other portable computing device that may be utilized to communicate information with wireless communication tag 120 and server 150. In some examples, mobile device 110 may be used to perform toll-based payment transactions. In some examples, mobile device 110 may be used to perform parking authority-based payment transactions.

Server 150 may facilitate the mobile application to be downloaded to mobile device 110. For example, the instructions associated with the mobile application may be stored within database 160. In some examples, mobile application may be downloaded in response to the wireless communication tag 120 being plug into the mobile device 110. Access-controlled service locations may be defined and stored in database 160 associated with server 150. Wi-Fi hotspots, Waypoints and a Cellular network communication system without either Wi-Fi and/or GPS may determine when a vehicle associated with the user passes an access-controlled service location.

Mobile device 110 may include a GPS that determines the current GPS location (latitude, longitude, and elevation) or current coordinates of the mobile device 110. In some implementations, mobile device 110 may utilize various ground-based systems to determine the location of the mobile device 110, based on, for example, positions of cell towers or positions of other known transmitters as are generally well understood. The mobile device 110 may determine its location by reference to a GPS system or other wireless sources.

In some examples, the mobile device 110 may receive a signal from the access-controlled service that either provides a position of the access-controlled service to the mobile device 110 or that facilitates the mobile device 110 in ascertaining the proximity to such access-controlled service. Such a signal may or may not specifically identify a position of the access-controlled service but nonetheless may assist the mobile device in determining its location based on such proximity.

In some examples, server 150 may receive, from mobile device 110, a request for coordinate information. In some implementations, the request may include the current GPS location or coordinates of the mobile device 110. In some examples, coordinate information may include toll road coordinates, toll gantry coordinates, and/or the RF transmit and receive frequency associated with the toll gantry coordinates (the RF frequencies at which the reader 170 and wireless communication tag 120 may communicate with one another). In some implementations, database 160 may store coordinate information.

The mobile device 110 incorporates a processor capable of being programmed to monitor the location of the device 110 and determine when the device 110 has entered a specific geographic area or fixed spatial location (geofence). The system 100 may use network 140 to connect to one or more authorities associated with one or more access-controlled services. The authorities may be for example governments or private toll operators, operators of parking structures, university campus, work campus, vehicle screening service providers or operators of roadside weigh stations.

Geofence metadata may be registered in database 160. Information from maps and metadata are stored as geofence metadata and used by the system 100. The system 100 may facilitate in finding a geofence stored in the database 160. The system 100 may determine a geographic location and search for the geographic location in the database 160. The system 100 may identify at least one geofence associated with the geographic location. The method includes receiving coordinate points and converting the coordinate points of a geographic location to an IP address and identifying one or more geofences that overlap or are associated with the coordinate point. The GPS is used to determine the location of the mobile device 110.

The server 150 may be configured to determine when the reader 170 has a false read. The server 150 audits the signal from the reader 170 to determine whether the user is actually within a geofence. Known locations are stored in database 160. If the user is not within a geofence of a known location, then the wireless communication tag 120 is not validated. If the user is within a geofence of a known location, the wireless communication tag 120 is validated and an amount of payment owed by the user in accessing the access-controlled service is determined. The amount of payment is then transferred via the server 150 to the authority associated with the access-controlled service.

A GPS receiver inside the mobile device 110 will be receive signals from satellites to calculate latitude and longitude of user and track movement. Once the user's position has been determined, the GPS unit can calculate other information, such as distance to reader 170. The server 150 may retrieve a portion of the coordinate information based on the current GPS location of the mobile device 110. In some implementations, server 150 may compare the coordinates of the mobile device 110 with the toll gantry coordinates to determine one or more toll gantries that are located within a predetermined distance of the mobile device 110.

In some examples, wireless communication tag 120 may include an embedded radio frequency identification (RFID) chip that transmits and receives radio signals. In some implementations, wireless communication tag 120 may include a transceiver circuit and an RF signal to digital signal converting circuitry. In some implementations, the RF signal may include an agency ID identifying a toll agency or parking authority for a parking structure where the reader 170 is provided and a location (i.e., place) of the toll gantry or parking structure.

While the wireless communication tag 120 is shown as being conceptually separate from the mobile device 110, in various embodiments, the tag 120 can actually be integrated as part of the mobile device 110. Accordingly, description indicating that the tag is "coupled" or "connected" to can include that the tag is actually integrated as part of the mobile device. For example, the tag 120 can be implemented through an antenna of the mobile device 110 that is used in wirelessly transmitting and/or receiving signals at the mobile device according to one or more communication protocols.

In some examples, the server 150 may receive the start toll coordinates and the end toll coordinates from the mobile device 110. In some implementations, the start toll coordinates include the coordinates of a first toll gantry that the user passes (entry toll gantry at which the user enters, for example) and the end coordinates include the coordinates of a second toll gantry that the user passes (exit toll gantry at which the user exits, for example). In some implementations, toll database 160 may determine a payment amount for a vehicle based on the start and end toll coordinates.

In some examples, the tag ID is registered on the server 150 and associated with a parking structure. The mobile device 110 determines a user associated with a vehicle has entered a parking structure. The server 150 registers the user as being "on-site" and the user will not be able to use the same wireless communication tag 120 to allow another vehicle to enter.

Figure 2A:
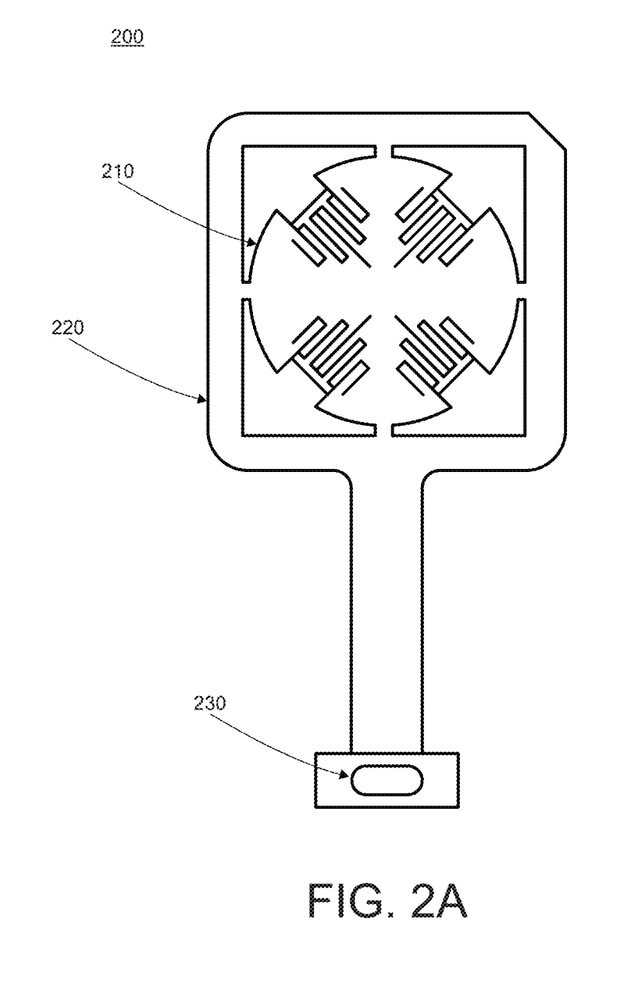
FIG. 2A is a schematic diagram illustrating a front view of the wireless communication tag of the exemplary system.

FIG. 2A is a schematic diagram illustrating a front view of the wireless communication tag 200 of the exemplary system. There is shown an omni-directional antenna 210. The omni-directional (i.e., multiple-axis) antenna 210 and associated circuitry, is preferably disposed within the antenna sheath 220 and is adapted to transmit multi-directional RF signals to a source, such as the wireless communication tag 120 tag, and receive RF response signals from the source. A female connector 230 is configured to mate with a corresponding male lightning port of mobile device 110.

The antenna sheath 220 is adapted to enclose the mechanical components of the antenna 210. The antenna 210 may be wrapped in a clear film for protection. The antenna sheath 220 may be constructed of a suitable conventional, dielectric thermoplastic or rubber material. The antenna sheath 220 may wrap around and become flush with the back of the mobile device 110.

The antenna 210 has a three-dimensional shape that maximizes its ability of being an omni-directional antenna. The omni-directional 210 eliminates the issue of mobile device 110 orientation. The antenna 210 has an Application Specific Integrated Chip (ASIC). The ASIC is an Analog-to-Digital Converter (ADC) with a limit on the voltage to communicate with the mobile device 110 without exceeding the safety and operation voltage threshold. The antenna 210 has four arrow like structures and each opposite structures are connected together through the microchip. The top left and bottom right are connected and isolated from the top right and the bottom left of the antenna 210. The antenna 210 has rounded corners.

The antenna 210 receives an initial signal from the reader 170. The signal has a query command embedded in it that "wakes up" the wireless communication tag 120. The tag 120 then responds with the appropriate information. The signal is then sent to the mobile device 110. The mobile device 110 pushes a signal back through the antenna 210 to be sent back to the reader 170.

Figure 2B:
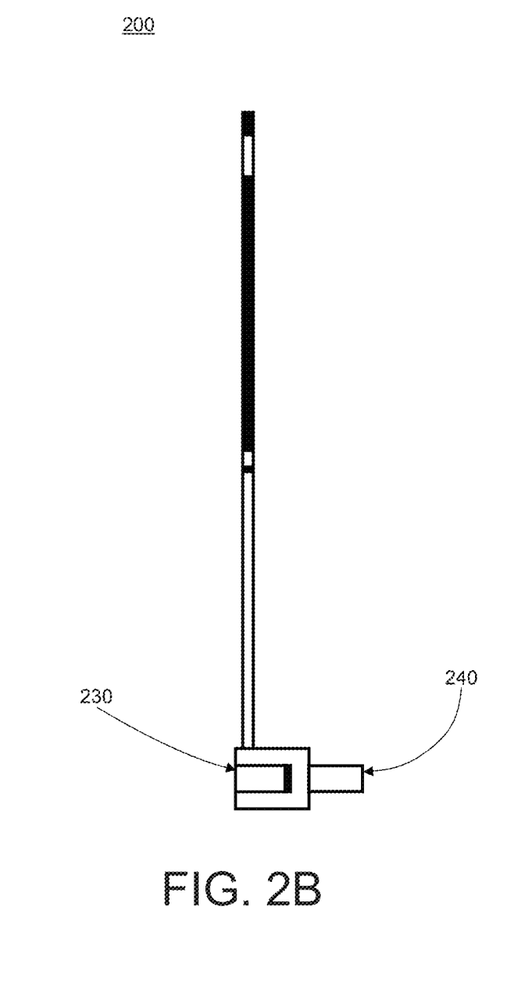
FIG. 2B is a schematic diagram illustrating a side view of the wireless communication tag of the exemplary system.

FIG. 2B is a schematic diagram illustrating a side view of the wireless communication tag 200 of the exemplary system. A mobile device connector 240 is configured to couple the wireless communication tag 120 mechanically and electrically to the mobile device 110. The mobile device connector 240 can include at least one of a micro-USB connector, a mini-USB connector, an Apple® 30-pin connector, an Apple® Lightning port connector, and a jack connector. The mobile device connector 240 protrudes from the wireless communication tag 200 and is configured to mate with a corresponding female lightning port of mobile device 110. The connector 240 may have embedded therein a microchip to control the data flow from any plug-ins. The microchip may be an ADC modifying the signal from a variable analog signal to a discrete digital signal. The microchip may be a power regulator and another chip that communicates using a Universal Asynchronous Receiver-Transmitter (UART) protocol.

Figure 3:
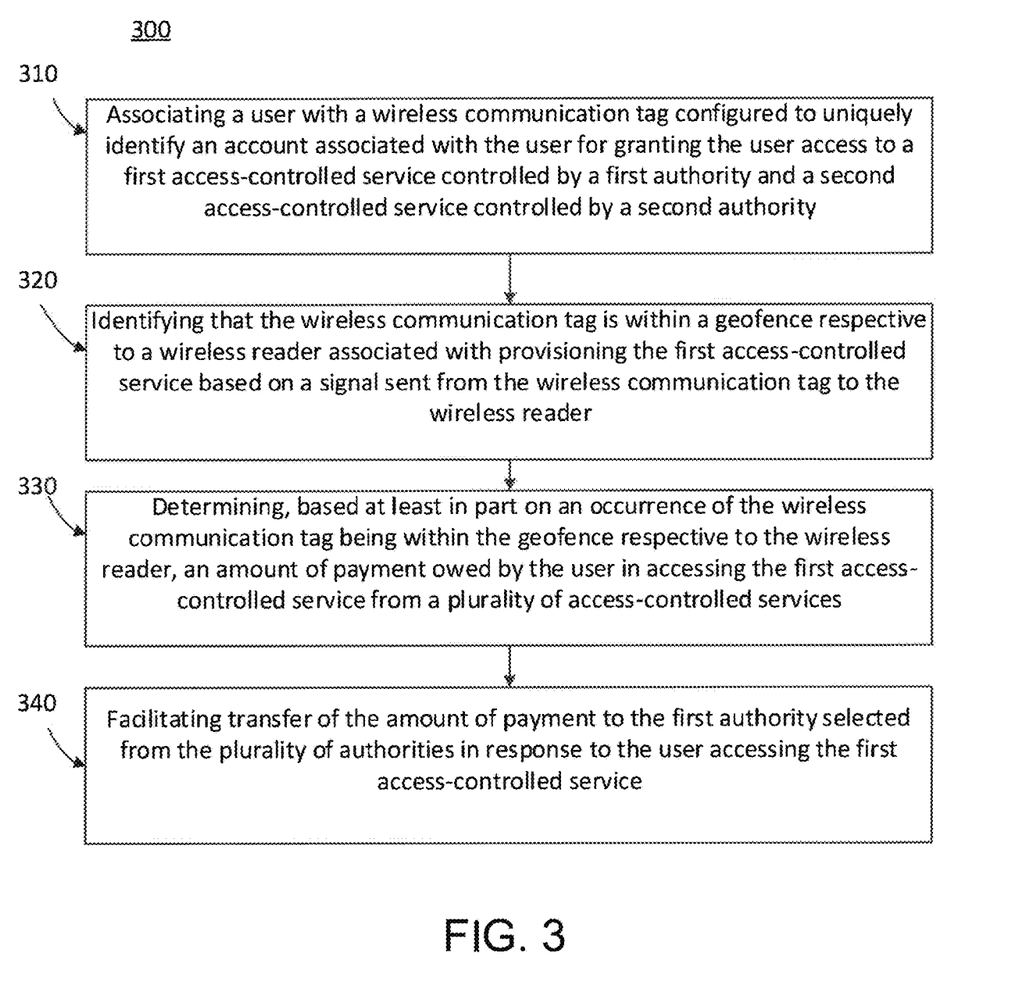
FIG. 3 is a flowchart illustrating a method according to an embodiment of the present disclosure.

FIG. 3 is a flowchart illustrating a method according to an embodiment of the present disclosure. At the step 310, a user is associated with the wireless communication tag 120, which is configured to uniquely identify the account associated with the user for granting the user access to a first access-controlled service controlled by a first authority and a second access-controlled service controlled by a second authority. The wireless communication tag 120 is agnostic to both the first access-controlled service and the second access-controlled service, meaning that it is not specific to either service and can be used in gaining access to both services. The wireless communication tag 120 is implemented through the omnidirectional antenna 210 that is removably coupled to the mobile device 110 associated with the user. The wireless communication tag 120 may be a radio-frequency identification (RFID) tag and the wireless reader is an RFID reader At step 320, the wireless communication tag is identified within a geofence respective to wireless reader 170 associated with provisioning the first access-controlled service based on a signal sent from the wireless communication tag to the wireless reader 170.

At step 330, it is determined based on an occurrence of the wireless communication tag 120 being within the geofence respective to the wireless reader 170, an amount of payment owed by the user in accessing the first access-controlled service. The first access-controlled service is among a plurality of access-controlled services including the first access-controlled service and the second access-controlled service across a plurality of authorities.

At step 340, transfer of the amount of payment to the first authority selected from the plurality of authorities is facilitated in response to the user accessing the first access-controlled service. Specifically, transfer of an amount of payment can be transferred from a third party system to the first authority.

In some examples, it is determined whether the mobile device has power and/or an applicable wireless communication channel is available or is usable in any way. If it is determined that the mobile device is not usable based on the foregoing, event data is stored at memory of the wireless communication tag that is separate from memory of the mobile device. The event data can indicate the occurrence of the wireless communication tag being within the geofence respective to the wireless reader. In turn, the event data may then be transmitted for determining the amount of payment owed by the user when a communication channel for transmitting the event data from the wireless communication tag becomes accessible.

Figure 4A:
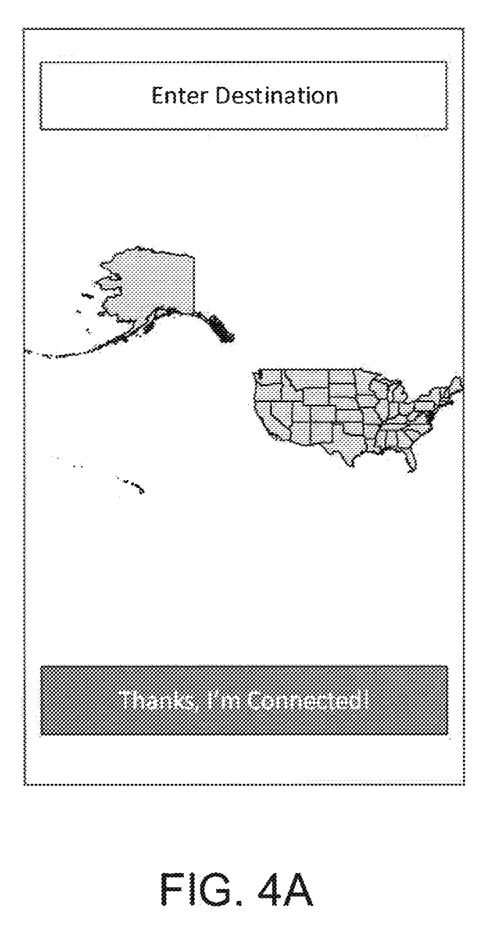
FIGS. 4A, 4B, 4C, and 4D illustrate an example of the user interface of the mobile application.
Figure 4B:
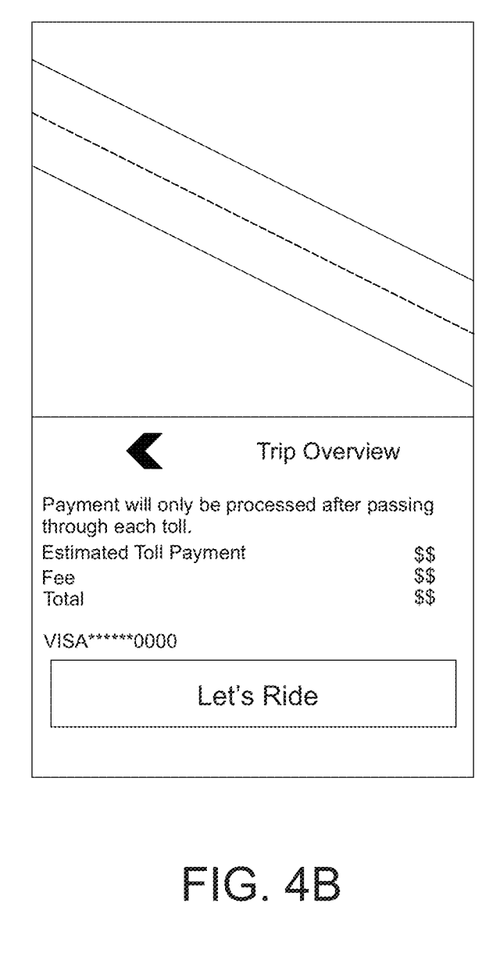
Figure 4C:
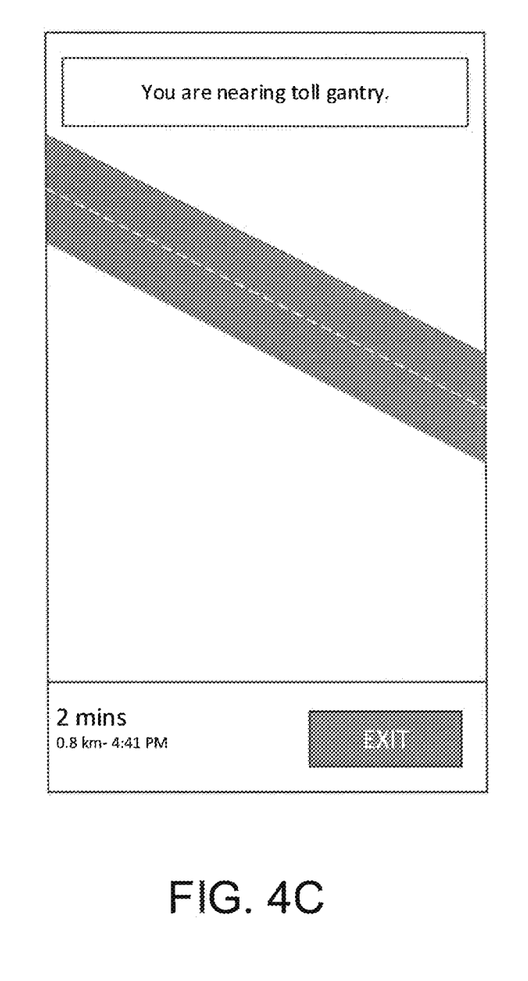
Figure 4D:
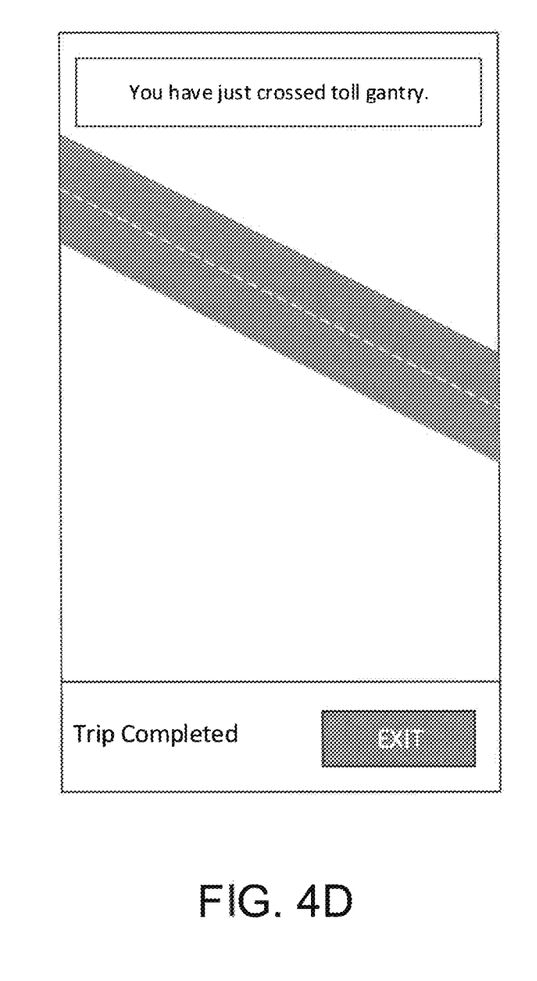

FIGS. 4A, 4B, 4C, and 4D illustrate an example of the user interface of the mobile application. The user will download the mobile application and sign up by creating an account. The user may create an account as an individual person, business owner with drivers, or employee of business owner. The user will provide their full name, phone number, email address, and a password. The phone number will be verified by a temporary pin. The user enters a shipping address that the wireless communication tag 120 will be shipped to. The shipping address may auto populate with suggestions. The user enters payment method information including name on card, card number, expiration date, and CVC code. The user may have more than one payment method. The user enters vehicle selection information and license plate number. The vehicle is selected from a drop-down menu that populates with vehicle type. The vehicle types include car/SUV/pickup truck, truck, bus, RV, motorcycle, and carpool. The user allows the mobile application to access location. The user attaches the wireless communication tag 120 to the mobile device 110 and enters a destination, as shown in FIG. 4A, by way of example. The user selects the destination and a trip overview is shown before the user completes this step. The trip overview includes an estimated toll payment, fee, and total, as shown in FIG. 4B, by way of example. Payment is not processed until after the user passes through each toll. The user receives an indication that the user is nearing a toll gantry location and that the user has crossed the toll gantry, as shown in FIGS. 4C and 4D, by way of example. After the trip is completed, the user may exit out of the trip details. The user may pull up information about previous trips under the trip history tap, which provides the amount charged and what toll gantries the user has passed and the respective toll authority. A web-based application may also be implemented with the same features of the mobile application.

Figure 5:
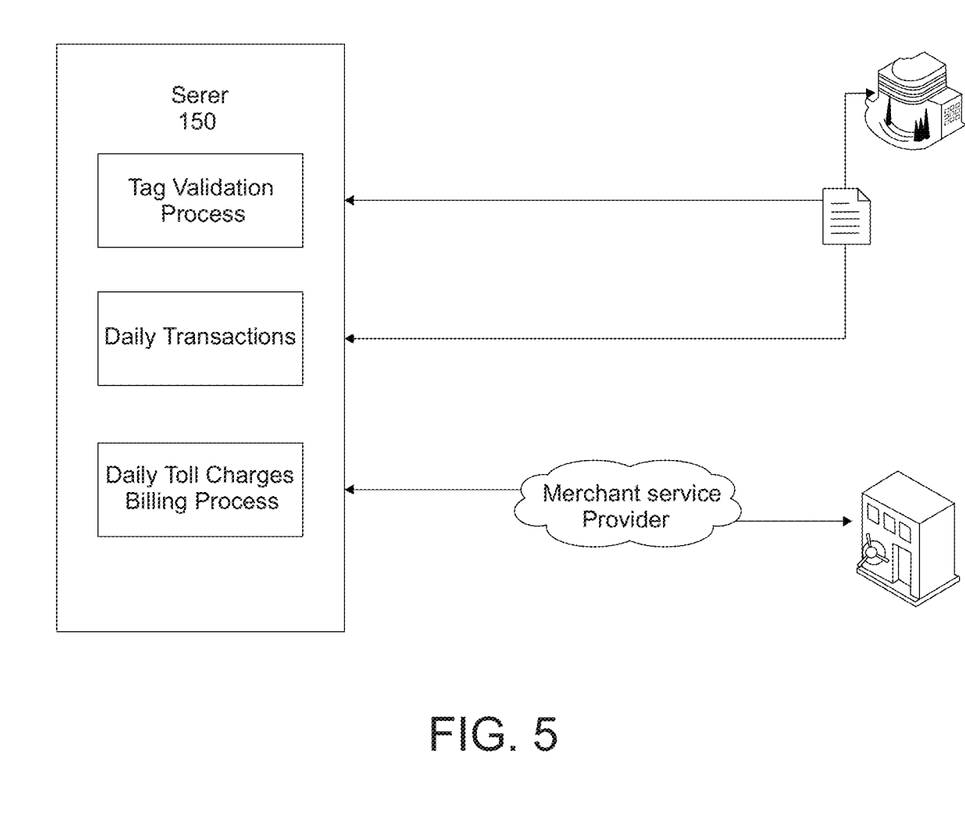
FIG. 5 is a schematic diagram illustrating the processing and data exchange of the exemplary system.

FIG. 5 is a schematic diagram illustrating the processing and data exchange of the exemplary system. Server 150 may include tag validation processes and a database associated with server 150 may store tag validation lists and daily transactions 540. The tag validation list and daily transactions 540 may be communicated to the authority 520 associated with the access-controlled services. Server 150 may include billing processes associated with daily toll charges and provide the charges to merchant service provide 510 that will communicate with a bank 530 to obtain the funds to satisfy the charges.

Several components described in this paper, including clients, servers, and engines, may be compatible with or implemented using a cloud-based computing system. As used in this paper, a cloud-based computing system is a system that provides computing resources, software, and/or information to client devices by maintaining centralized services and resources that the client devices may access over a communication interface, such as a network. The cloud-based computing system may involve a subscription for services or use a utility pricing model. Users may access the protocols of the cloud-based computing system through a web browser or other container application located on their client device.

This paper describes techniques that those of skill in the art may implement in numerous ways. For instance, those of skill in the art may implement the techniques described in this paper using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used in this paper, the term 'processor' refers to one or more devices, circuits, and/or processing cores configured to process data, such as computer program instructions.

Methods according to the above-described examples can be implemented using computer-executable instructions that are stored or otherwise available from computer readable media, e.g. a non-transitory computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
    associating a user with a wireless communication tag configured to uniquely identify an account associated with the user for granting the user access to a first access-controlled service controlled by a first authority and a second access-controlled service controlled by a second authority, wherein the wireless communication tag is implemented through an omnidirectional antenna removably coupled to a mobile device associated with the user;
    identifying that the wireless communication tag and an additional wireless tag is within a geofence respective to a wireless reader associated with provisioning the first access-controlled service based on signals sent from the wireless communication tag and the additional wireless tag to the wireless reader;
    prioritizing the signal from the wireless communication tag over the signal from the additional wireless tag;
    determining, based at least in part on an occurrence of the wireless communication tag being within the geofence respective to the wireless reader and the wireless communication tag being prioritized over the additional wireless tag, an amount of payment owed by the user in accessing the first access-controlled service from a plurality of access-controlled services including the first access-controlled service and the second access-controlled service across a plurality of authorities; and facilitating transfer of the amount of payment to the first authority selected from the plurality of authorities in response to the user accessing the first access-controlled service.

2. The method of claim 1, wherein the wireless communication tag is a radio-frequency identification (RFID) tag and the wireless reader is an RFID reader.

3. The method of claim 1, further comprising validating that the wireless communication tag is within a geofence respective to the wireless reader based on a location of the wireless communication tag when the wireless communication tag sends the signal to the wireless reader and a known location of the wireless reader.

4. The method of claim 1, further comprising determining that the wireless communication tag is not within a geofence respective to the wireless reader based on a location of the wireless communication tag when the wireless communication tag sends the signal to the wireless reader and an unknown location of the wireless reader.

5. The method of claim 1, further comprising:
determining, based at least in part on the occurrence of the wireless communication tag being within the geofence respective to the wireless reader, an amount of payment owed by the user in accessing the second access-controlled service from the plurality of access-controlled services including the first access-controlled service and the second access-controlled service across the plurality of authorities; and
facilitating transfer of the amount of payment to the second authority selected from the plurality of authorities in response to the user accessing the second access-controlled service.

6. The method of claim 1, further comprising:
identifying a wireless configuration for communicating with the wireless reader associated with provisioning the first access-controlled service; and
automatically configuring the wireless communication tag to communicate with the wireless reader based on the wireless configuration.

7. The method of claim 1, further comprising:
accessing a payment schedule of the first authority from a plurality of payment schedules associated with plurality of access-controlled services in response to both:
the occurrence of the wireless communication tag being within the geofence respective to the wireless reader; and
the wireless reader being associated with provisioning of the first access-controlled service; and
determining the amount of payment owed based on the payment schedule of the first authority.

8. The method of claim 1, further comprising deducting the amount of payment from an account associated with the user after or concurrently with the transfer of the amount of payment to the first authority.

9. The method of claim 1, wherein a third party system separate from the plurality of authorities is configured to determine the amount of payment owed by the user in accessing the first access-controlled service and facilitate the transfer of the amount of payment to the first authority.

10. The method of claim 1, further comprising:
storing event data indicating the occurrence of the wireless communication tag being within the geofence respective to the wireless reader at memory of the wireless communication tag that is separate from memory of the mobile device; and
transmitting the event data for determining the amount of payment owed by the user when a communication channel for transmitting the event data from the wireless communication tag becomes accessible.

11. A system comprising:
a wireless communication tag associated with a user that is configured to uniquely identify an account associated with the user for granting the user access to a first access-controlled service controlled by a first authority and a second access-controlled service controlled by a second authority, wherein the wireless communication tag is implemented through an omnidirectional antenna removably coupled to a mobile device associated with the user; and
one or more computing systems configured to:
identify that the wireless communication tag and an additional wireless tag is within a geofence respective to a wireless reader associated with provisioning the first access-controlled service based on a-signals sent from the wireless communication tag and the additional wireless tag to the wireless reader;
prioritizing the signal from the wireless communication tag over the signal from the additional wireless tag;
determine, based at least in part on an occurrence of the wireless communication tag being within the geofence respective to the wireless reader and the wireless communication tag being prioritized over the additional wireless tag, an amount of payment owed by the user in accessing the first access-controlled service from a plurality of access-controlled services including the first access-controlled service and the second access-controlled service across a plurality of authorities; and
facilitate transfer of the amount of payment to the first authority selected from the plurality of authorities in response to the user accessing the first access-controlled service.

12. The system of claim 11, wherein the wireless communication tag is a radio-frequency identification (RFID) tag and the wireless reader is an RFID reader.

13. The system of claim 11, wherein one or more computing systems are further configured to:
validate that the wireless communication tag is within a geofence respective to the wireless reader based on a location of the wireless communication tag when the wireless communication tag sends the signal to the wireless reader and a known location of the wireless reader.

14. The system of claim 11, wherein one or more computing systems are further configured to:
determine, based at least in part on the occurrence of the wireless communication tag being within the geofence respective to the wireless reader, an amount of payment owed by the user in accessing the second access-controlled service from the plurality of access-controlled services including the first access-controlled service and the second access-controlled service across the plurality of authorities; and
facilitate transfer of the amount of payment to the second authority selected from the plurality of authorities in response to the user accessing the second access-controlled service.

15. The system of claim 11, wherein one or more computing systems are further configured to:
identifying a wireless configuration for communicating with the wireless reader associated with provisioning the first access-controlled service; and automatically configuring the wireless communication tag to communicate with the wireless reader based on the wireless configuration.

16. The system of claim 11, wherein one or more computing systems are further configured to:
access a payment schedule of the first authority from a plurality of payment schedules associated with plurality of access-controlled services in response to both:
the occurrence of the wireless communication tag being within the geofence respective to the wireless reader; and
the wireless reader being associated with provisioning of the first access-controlled service; and
determine the amount of payment owed based on the payment schedule of the first authority.

17. The system of claim 11, wherein one or more computing systems are further configured to deduct the amount of payment from an account associated with the user after or concurrently with the transfer of the amount of payment to the first authority.

18. The system of claim 11, wherein a third party system separate from the plurality of authorities is configured to determine the amount of payment owed by the user in accessing the first access-controlled service and facilitate the transfer of the amount of payment to the first authority.

19. The system of claim 11, wherein one or more computing systems are further configured to:
store event data indicating the occurrence of the wireless communication tag being within the geofence respective to the wireless reader at memory of the wireless communication tag that is separate from memory of the mobile device; and
transmit the event data for determining the amount of payment owed by the user when a communication channel for transmitting the event data from the wireless communication tag becomes accessible.

20. A system comprising:
one or more processors;
a memory coupled to the processors; and
instructions embodied in the memory and executable by the processors, wherein the instructions are configured to:
associate a user with a wireless communication tag configured to uniquely identify an account associated with the user for granting the user access to a first access-controlled service controlled by a first authority and a second access-controlled service controlled by a second authority, wherein the wireless communication tag is implemented through an omnidirectional antenna removably coupled to a mobile device associated with the user,
identify that the wireless communication tag and an additional wireless tag is within a geofence respective to a wireless reader associated with provisioning the first access-controlled service based on a-signals sent from the wireless communication tag and the additional wireless tag to the wireless reader,
prioritize the signal from the wireless communication tag over the signal from the additional wireless tag;
determine, based at least in part on an occurrence of the wireless communication tag being within the geofence respective to the wireless reader and the wireless communication tag being prioritized over the additional wireless tag, an amount of payment owed by the user in accessing the first access-controlled service from a plurality of access-controlled services including the first access-controlled service and the second access-controlled service across a plurality of authorities, and
facilitate transfer of the amount of payment to the first authority selected from the plurality of authorities in response to the user accessing the first access-controlled service.

21. The method of claim 1, wherein prioritization is based at least in part on a location of the wireless communication tag and an additional wireless tag, wherein the location is determined from a Global Position System.

* * * * *